US011022508B2

(12) United States Patent
Doelling

(10) Patent No.: US 11,022,508 B2
(45) Date of Patent: Jun. 1, 2021

(54) TORQUE DETECTION UNIT AND VEHICLE

(71) Applicant: Robert Bosch GmbH, Stuttgart (DE)

(72) Inventor: Rolando Doelling, Hechingen (DE)

(73) Assignee: Robert Bosch GmbH, Stuttgart (DE)

( * ) Notice: Subject to any disclaimer, the term of this patent is extended or adjusted under 35 U.S.C. 154(b) by 258 days.

(21) Appl. No.: 16/091,427

(22) PCT Filed: Feb. 24, 2017

(86) PCT No.: PCT/EP2017/054270
§ 371 (c)(1),
(2) Date: Jun. 18, 2019

(87) PCT Pub. No.: WO2017/174259
PCT Pub. Date: Oct. 12, 2017

(65) Prior Publication Data
US 2019/0293503 A1 Sep. 26, 2019

(30) Foreign Application Priority Data
Apr. 7, 2016 (DE) .......................... 102016205784.7

(51) Int. Cl.
*G01L 3/10* (2006.01)
(52) U.S. Cl.
CPC ................... *G01L 3/105* (2013.01)
(58) Field of Classification Search
CPC .......... G01L 3/101; G01L 3/102; G01L 3/103
See application file for complete search history.

(56) References Cited

U.S. PATENT DOCUMENTS

| 4,646,576 A | * | 3/1987 | Kita | ........................ | G01L 3/105 |
| | | | | | 73/779 |
| 4,803,885 A | * | 2/1989 | Nonomura | .............. | G01L 3/102 |
| | | | | | 73/862.333 |
| 4,896,544 A | * | 1/1990 | Garshelis | ................ | G01L 3/105 |
| | | | | | 73/862.333 |
| 4,939,937 A | * | 7/1990 | Klauber | .................. | G01L 3/102 |
| | | | | | 73/862.333 |

(Continued)

FOREIGN PATENT DOCUMENTS

| CN | 1952637 A | 4/2007 |
| CN | 101283236 A | 10/2008 |

(Continued)

OTHER PUBLICATIONS

Lüddecke, et al.: "Engine crank angle resolved turbocharger turbine performance measurements by contactless shaft torque detection", in SienceDirect | 11th Int'l Conference on Turbocharges and Turbocharging (2015), pp. 301-320.

(Continued)

*Primary Examiner* — Natalie Huls
(74) *Attorney, Agent, or Firm* — Norton Rose Fulbright US LLP; Gerard Messina

(57) ABSTRACT

A torque detection unit for actively detecting a torque acting on a shaft, and in particular on a crankshaft, of a vehicle drivable by muscle power and/or by motor power along a rotational axis, including an excitation unit, which is configured to apply a magnetic field which changes over time to the shaft, and a first sensor unit and a second sensor unit, which are configured to detect a magnetic field carried by the shaft, the first and the second sensor unit, in particular with an otherwise identical setup, having different orientations with respect to one another so that they, during operation, are oriented differently from one another with respect to the shaft, and in particular with respect to the rotational axis.

17 Claims, 19 Drawing Sheets

(56) References Cited

U.S. PATENT DOCUMENTS

| | | | |
|---|---|---|---|
| 4,979,399 A | 12/1990 | Klauber et al. | |
| 5,307,690 A | 5/1994 | Hanazawa | |
| 5,431,063 A * | 7/1995 | Yasui | G01D 5/48 |
| | | | 73/779 |
| 6,581,480 B1 * | 6/2003 | May | G01L 3/102 |
| | | | 73/862.333 |
| 9,429,488 B2 * | 8/2016 | Lu | G01L 1/125 |
| 10,247,627 B2 * | 4/2019 | May | G01L 1/127 |
| 2004/0056748 A1 * | 3/2004 | Masaki | G01L 5/221 |
| | | | 336/119 |
| 2008/0134802 A1 | 6/2008 | Okulov | |
| 2008/0197799 A1 | 8/2008 | Tomigashi | |
| 2011/0126639 A1 | 6/2011 | Behrens | |
| 2012/0074933 A1 | 3/2012 | Lee | |
| 2013/0335072 A1 | 12/2013 | Malzfeldt | |
| 2014/0184210 A1 * | 7/2014 | Campbell | G01L 3/102 |
| | | | 324/209 |
| 2014/0360285 A1 | 12/2014 | Barraco et al. | |
| 2016/0025579 A1 * | 1/2016 | Matysik | G01L 5/0061 |
| | | | 73/862.335 |
| 2018/0052065 A1 * | 2/2018 | Sipila | G01L 3/102 |
| 2019/0187011 A1 * | 6/2019 | Sipilae et al. | G01L 3/102 |
| 2020/0225103 A1 * | 7/2020 | Panine | G01L 3/102 |
| 2020/0225104 A1 * | 7/2020 | Schanz | G01L 3/102 |

FOREIGN PATENT DOCUMENTS

| | | |
|---|---|---|
| CN | 101715407 A | 5/2010 |
| CN | 101715548 A | 5/2010 |
| CN | 102293187 A | 12/2011 |
| CN | 102445146 A | 5/2012 |
| CN | 104044637 A | 9/2014 |
| CN | 104246440 A | 12/2014 |
| DE | 1220634 B | 7/1966 |
| DE | 3508337 A1 | 11/1985 |
| DE | 3518161 A1 | 11/1986 |
| DE | 102006017727 A1 | 10/2007 |
| EP | 2928050 A1 | 10/2015 |
| JP | S5999228 A | 6/1984 |
| JP | S61258132 A | 11/1986 |
| WO | 2012152517 A1 | 11/2012 |
| WO | 2013104447 A1 | 7/2013 |
| WO | 2014166655 A1 | 10/2014 |
| WO | 2015132123 A1 | 9/2015 |
| WO | 2017152517 A1 | 9/2017 |

OTHER PUBLICATIONS

Sakai, et al.: "Performance and flow-field assessment of an EGR pulse optimised asymmetric double-entry turbocharger turbine". in ScienceDirect l 11th Int'l Conference on Turbochargers and Turbocharging, (2015), pp. 321-332.

Dengquan, Wang: "Non-contact torque measurement for ultrasonic motor based on inverse magneto-elastic effect", MD Dissertation Master Thesis, (2011), Full-text Database Eng. Sci. & Tech. Series II, No. 7, pp. C042-65, Shanghai, China.

International Search Report for PCT/EP2017/0542710, dated May 31, 2017.

* cited by examiner

TORQUE DETECTION UNIT AND VEHICLE

FIELD OF THE INVENTION

The present invention relates to a torque detection unit and to a vehicle. The present invention relates in particular to a torque detection unit for actively detecting a torque acting on a shaft, and in particular on a crankshaft, of a vehicle drivable by muscle power and/or by motor power along a rotational axis, and to a vehicle, a bicycle, an electric bicycle, an e-bike, a pedelec or the like drivable by muscle power and/or by motor power.

BACKGROUND INFORMATION

During the monitoring and/or control of drive units, for example in the area of vehicle engineering, it is often desirable to detect the torque acting on a shaft of a drive unit.

Torque detection units are used for this purpose, which utilize effects related to the mechanical stresses in the shaft to be able to infer the value of a torque acting on the axle. Materials may be used here which show a piezoelectric effect dependent on the mechanical stresses or an inverse magnetostrictive effect. The value of the torque is related, for example, to a passively tappable voltage or to a measurable magnetic field and its changes.

The drawback is that, on the one hand, only the electrical or magnetic variables are resorted to, which the material itself to which the torque is applied provides. On the other hand, such a procedure is subject to corresponding measuring errors due to perturbations in the thermal area, for example in terms of a temperature drift, or in the mechanical area, e.g., in terms of occurring vibrations or deformations of the drive components. These measuring errors often remain undetected and may result in misinterpretations in the evaluation of the detected values of the presumably occurring torque.

SUMMARY OF THE INVENTION

The torque detection unit according to the present invention having the features described herein, has the advantage over the related art that it is possible to ascertain the torques acting on the shaft with a high degree of reliability and accuracy, without special material provisions in the area of the shaft to be examined. According to the present invention, this is achieved by the features described herein in that a torque detection unit for actively detecting a torque acting on an idle or rotating shaft, and in particular on an idle or rotating crankshaft, of a vehicle drivable by muscle power and/or by motor power along a rotational axis X is created, including an excitation unit, which is configured to apply a magnetic field which changes over time to the shaft, and a first sensor unit and a second sensor unit, which are configured to detect a magnetic field carried by the shaft, the first and the second sensor units, in particular with an otherwise identical design, having different orientations with respect to one another so that they, during operation, are oriented differently from one another with respect to the shaft, and in particular with respect to rotational axis X. Due to the measures according to the present invention, and in particular due to the orientations of the first and second sensor units deviating from one another, these detect a magnetic field carried by the shaft, which is excited by the excitation unit by the application of a magnetic field which changes over time, and in particular by an alternating magnetic field, in a different manner. With the aid of an appropriate evaluation, for example a difference formation of the detected signals, the effects stemming from the torque application, in terms of the signal components in the detected magnetic field which are orientation-dependent, may then be considered separately from the signal components of the first and second sensor units stemming from perturbations which are independent of the orientation of the sensor units or more independent of the orientation of the sensor units than the signal components related to the applied torque.

In practice, this means that both sensor units measure the same shaft to which the torque is applied, but with different orientations. One sensor unit may be configured in such a way that it detects the magnetic field related to the torque application with particularly high sensitivity, while the second sensor unit essentially serves as a compensation sensor and is aligned with an orientation which, even though it detects the perturbations in an unchanged manner, is influenced comparatively little by the effects stemming from the torque application.

Ideally, the orientation of the sensor units with respect to one another is configured in such a way that one sensor unit detects only the perturbations, and the other sensor unit detects the signal underlying the torque, including the perturbation, so that the torque is ascertainable particularly accurately from the, possibly weighted, difference of the signals. A rotation with respect to one another of 45° is particularly advantageous.

According to the present invention, in particular perturbations are eliminated which are related to external magnetic fields, e.g., the Earth's field and/or the surroundings, the rotation of the shaft, e.g., due to the non-ideal shaft geometry, vibrations, temperature changes and the like.

The further descriptions herein show refinements of the present invention.

A high degree of independence of the two sensor units arises when, according to one refinement of the torque detection unit according to the present invention, each sensor unit in itself is formed by the excitation unit having a dedicated exciter for generating the magnetic field to be applied. For enhanced comparability, the dedicated exciters may be configured identically.

However, the technical measuring effort and systematic deviations may be kept particularly low when a shared exciter is provided for the sensor units.

In any case, a respective exciter may be configured with or from a solenoid coil and, if necessary, a respective core for amplifying the exciting magnetic field.

Generally, all types of sensor units may be used which, based on the one or other physical effect, are able to detect a magnetic flux density.

A particularly high degree of metrological design variety arises, however, when according to one specific embodiment of the torque detection unit according to the present invention a respective sensor unit includes one or multiple reception coil(s), in particular four reception coils and/or having a core in each case. The reception coils and/or the cores may be identical.

The measuring accuracy of the torque detection unit may be increased in that, according to one advantageous refinement, the reception coils of a respective sensor unit are interconnected in the manner of a bridge circuit, in particular in the form of a Wheatstone and/or inductivity resonance measuring bridge and/or to a tuning resistor connected in series and/or a tuning capacitor connected in parallel to a respective reception coil.

The elements for tuning, namely a respective tuning resistor and/or a respective tuning capacitor, may be selected in such a way, for example by being configured to be variable, that a detected measured value in a certain situation, for example in a state which is load-free per se with no torque acting from the outside, a vanishing detection signal is present.

A particularly high degree of reproducibility, sensitivity and accuracy arises when a respective sensor unit has a high degree of symmetry with respect to the shaft to be examined and its rotational axis.

According to one refinement of the torque detection unit according to the present invention, for example, it is provided that the reception coils of a sensor unit, in particular with their coil axes, are situated at the end points or in the area of the end points of a cross, which may be a perpendicular cross, a cross having equally long sides and/or with an exciter in the area of the intersecting point.

On the one hand, the sensor units may be matched to one another and also be maintained independently of one another if, according to one further alternative of the torque detection unit according to the present invention, the sensor units are or are being configured spatially and/or structurally separated or separately.

However, particularly compact configurations having an increased degree of reproducible results may be achieved if, according to one further advantageous refinement of the torque detection unit according to the present invention, the sensor units are or are being configured to be integrated with one another, overlapping one another, crossed with one another and/or in a shared structural unit.

In particular, it may be provided that the respective sensor units are situated with a concentric arrangement of their possibly provided intersecting points, in particular in the area of the shared intersecting point or of the overlapping intersecting points a shared exciter also being configured.

It is conceivable that the components of the sensor units and of the excitation unit are or are being configured as discrete components, for example in the form of wound coils or the like.

However, a particularly high degree of compactness may be achieved by another advantageous refinement of the torque detection unit according to the present invention in that a respective sensor unit, in particular a respective reception coil, and/or a respective exciter, in particular a respective solenoid coil, is/are configured or is/are being configured at least partially as a structure of a board or circuit board or a plurality thereof.

To be able to utilize the values and signals provided by the sensor units in a meaningful manner, the torque detection unit according to the present invention is configured in one refinement with an evaluation and control unit, which is configured to receive representative values for the detected magnetic fields output by the sensor units and to determine the value of a torque acting on the shaft based on the received values.

With regard to the increase in the evaluation accuracy, it may be provided that the evaluation and control unit is configured to use a weighted difference between the values received from the first sensor unit and the values received from the second unit as a basis.

A core aspect of the present invention is thus also based, among other things, on the circumstance that a torque applied externally onto a shaft causes the mechanical state of the shaft, in terms of the distribution of mechanical stresses in the volume and on the surface of the shaft, to be changed in such a way that this is detectable toward the outside due to a changing reciprocal action on a magnetic field which is actively irradiated from the outside and changes over time. In this case, surface waves and/or surface torsion waves, which are generated by the torque load in the shaft, play a particular role.

The present invention, in terms of a use, furthermore relates to a vehicle drivable by muscle power and/or by motor power, in particular a bicycle, an electric bicycle, an e-bike, a pedelec or the like, including at least one wheel, a drive for driving the at least one wheel, and a torque detection unit according to the present invention for detecting a torque acting on a shaft of the drive, in which the drive is monitorable and/or controllable based on the detected torque.

With reference to the accompanying figures, specific embodiments of the present invention are described in greater detail.

DETAILED DESCRIPTION

Figure 1:
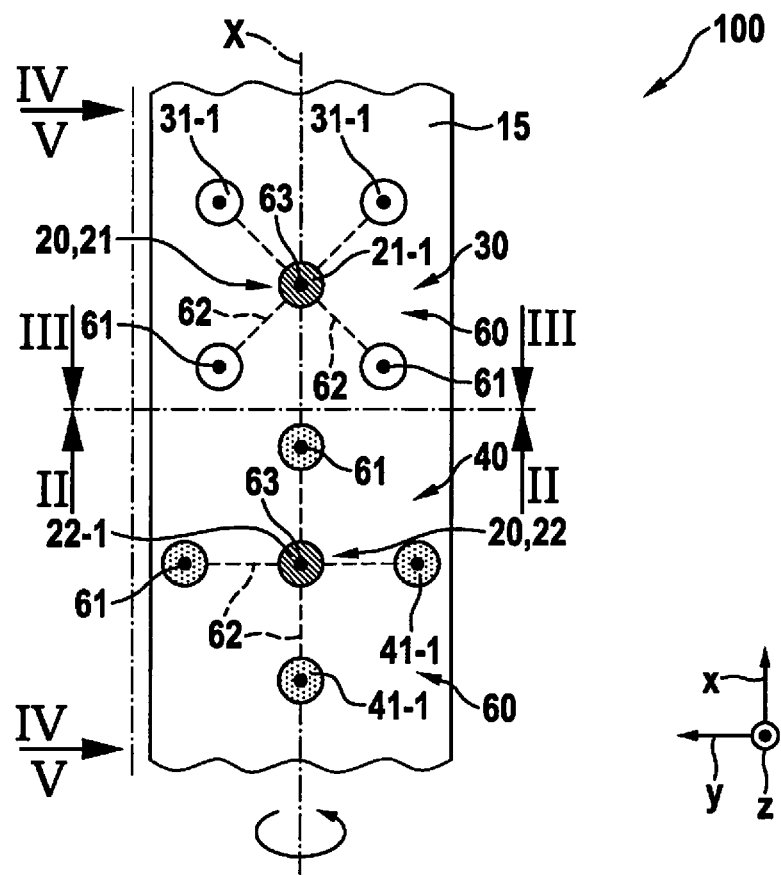
FIGS. 1, 2, 3, 4, and 5 show, in schematic views from different sides, one specific embodiment of the torque detection unit according to the present invention including sensor units which are spatially separated from one another.

With reference to FIGS. 1 through 26, exemplary embodiments of the present invention are described hereafter in greater detail. Identical and equivalent as well as identically or equivalently acting elements and components are denoted by the same reference numerals. The detailed description of the denoted elements and components is not provided each time they occur.

The features and further properties may be arbitrarily separated from one another and arbitrarily combined with one another, without departing from the core of the present invention.

Figure 26:
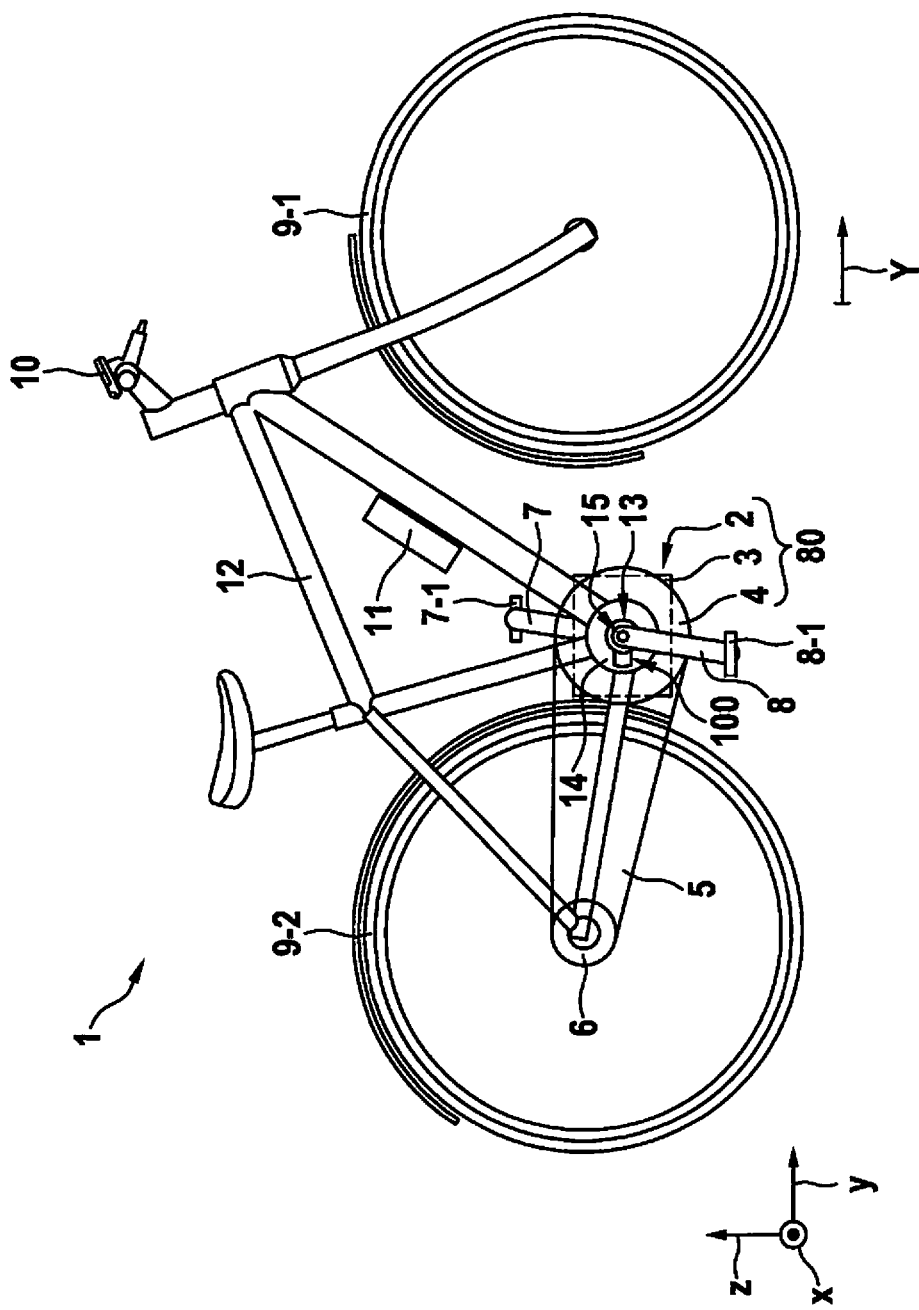
FIG. 26 shows, in a schematic side view, one specific embodiment of a vehicle according to the present invention as a type of electric bicycle, using one specific embodiment of the torque detection unit according to the present invention.

Initially, with reference to FIG. 26, an electric bicycle is described in detail by way of example as a specific embodiment of vehicle 1 according to the present invention.

Being an electric bicycle, vehicle 1 includes a frame 12 on which a front wheel 9-1, a rear wheel 9-2 and a crank mechanism 2 including two cranks 7, 8 having pedals 7-1 and 8-1 are situated. An electric drive 3 is integrated into crank mechanism 2. A pinion 6 is situated on rear wheel 9-2.

A drive torque, which is provided by the rider and/or by electric drive 3, is transmitted from a chain ring 4 on crank mechanism 2 via a chain 5 to pinion 6.

Furthermore, a control unit 10, which is connected to electric drive 3, is situated on the handle bar of vehicle 1.

Furthermore, battery 11, which is used to supply electric drive 3 with power, is configured in or on frame 12.

Furthermore, a crank bearing 13 or bottom bracket, which includes a crankcase 14 and a crankshaft 15, is integrated into frame 12.

Drive 80 of vehicle 1 according to the present invention thus, in total, includes crank mechanism 2 for actuation by the rider with the aid of muscle power and the additional or alternative electric drive 3.

One specific embodiment of torque detection unit 100 according to the present invention is also configured in the area of drive 80 to detect the load from a torque on crankshaft 15.

Based on the triad illustrated in FIG. 26, it becomes apparent that the vehicle extends with its longitudinal extension direction Y in parallel to the y direction, while the transverse extension direction extends in parallel to the x direction and coincides with the direction of axis X of crankshaft 15.

FIGS. 1 through 5 show different views of one specific embodiment of torque detection unit 100 according to the present invention.

The basic structure of torque detection unit 100 is best apparent from the top view according to FIG. 1. There, crankshaft 15 is illustrated as a shaft to which a torque may be applied and which is to be monitored. Crankshaft 15 is oriented in the x direction and rotatably mounted about an axis X in parallel to the x direction, as is also illustrated in connection with FIG. 26 for vehicle 1 according to the present invention.

The specific embodiment of torque detection unit 100 according to the present invention shown in FIG. 1 is made up of a first sensor unit 30 and a second sensor unit 40.

First sensor unit 30 serves as a measuring sensor unit and includes four reception coils 31-1, which are situated at end points 61 of a perpendicular cross 60 provided with equally long sides 62. In the center of cross 60, i.e., intersecting point 63, an exciter 21 in the form of a solenoid coil 21-1 is present as part of an excitation unit 20.

As a measuring sensor unit, first sensor unit 30 is oriented with its alignment cross 60 in such a way that rotational axis X in projection encloses an angle of 45 degrees with sides 62 of alignment cross 60 of first sensor unit 30. In this way, the magnetic field carried and excited by shaft 15 by excitation with the aid of excitation unit 20 may be detected particularly accurately.

In addition to first sensor unit 30, a second sensor unit 40 having the same setup as first sensor unit 30, but having a different orientation, is configured separately from first sensor unit 30 and spaced slightly spatially apart therefrom. Both intersecting point 63 of positioning cross 60 of first sensor unit 30 and intersecting point 63 of positioning cross 60 of second sensor unit 40, in projection, are situated on rotational axis X of shaft 15, and in particular on an axis extending in parallel to rotational axis X of crankshaft 15.

In contrast to positioning cross 60 of first sensor unit 30, however, the first pair of sides 62 of positioning cross 60 of second sensor unit 40, in projection, is situated perpendicularly on rotational axis X, while the other pair of sides 62, in projection, extends in parallel to axis X of shaft 15.

First sensor unit 30 and sensor unit 40, as FIG. 1, are thus oriented rotated by 45 degrees about the z axis with respect to one another.

In this way, first sensor unit 30 measures the magnetic field carried by shaft 15 with a particularly high degree of sensitivity, while the sensitivity for second sensor unit 40 as a compensation sensor is lower for the magnetic field carried by shaft 15, however the sensitivity for perturbations remains unchanged compared to the sensitivity for perturbations of first sensor unit 30.

This particularly advantageously allows the difference formation of the signals output by first and second sensor units 30 and 40, if necessary in weighted and/or post-processed form, to thus be able to filter out the perturbations and particularly precisely detect the effect generated by the acting torque on the carried magnetic field, and in particular with the goal of determining the value of the acting torque, which may be precisely and interference-free.

The mutual orientation of sensor units 30 and 40 advantageously is to be configured in such a way that, e.g., second sensor unit 40 detects only the interferences, and first sensor 30 detects the signal underlying the torque, including interferences. The torque may then be ascertained particularly precisely from a, possibly weighted, difference of the signals. For example, a mutual rotation of 45° especially between sensor units 30 and 40 may be advantageous.

According to the present invention, in particular interferences are thus eliminated which are related to external magnetic fields, e.g., the Earth's field and/or the surroundings, the rotation of the shaft, e.g., due to the non-ideal geometry of shaft 15, vibrations, temperature changes and the like.

Figure 2:
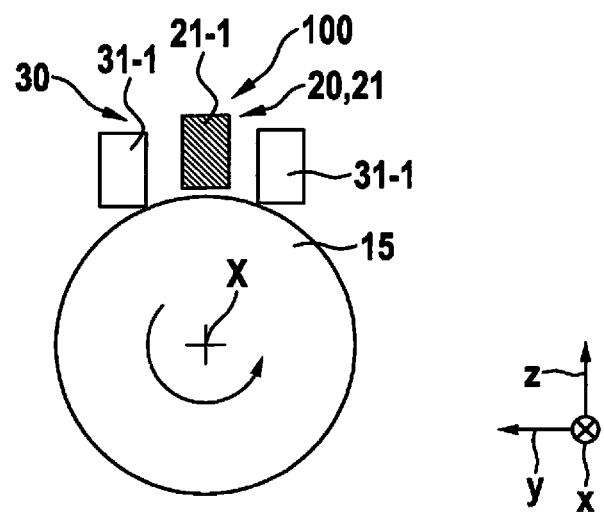

FIG. 2 shows a view of the arrangement from FIG. 1 in section plane II-II from FIG. 1.

Figure 3:
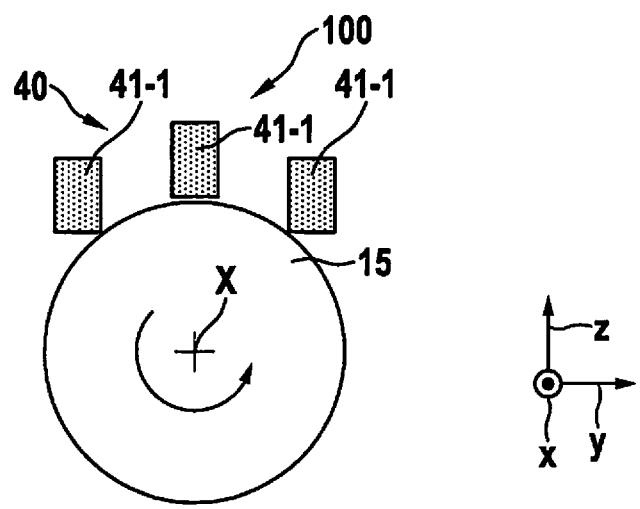

FIG. 3 shows a view of the arrangement from FIG. 1 with a view of section plane III-III from FIG. 1.

Figure 4:
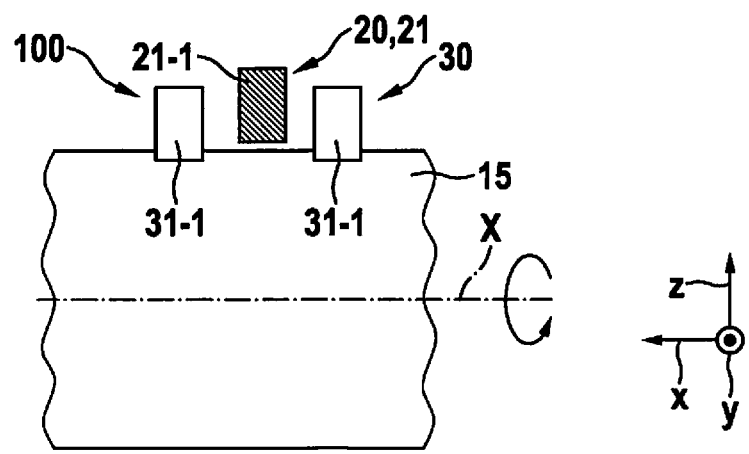

FIG. 4 shows a top view onto the arrangement from FIG. 1 with a view of projection plane IV-IV from FIG. 1.

Figure 5:
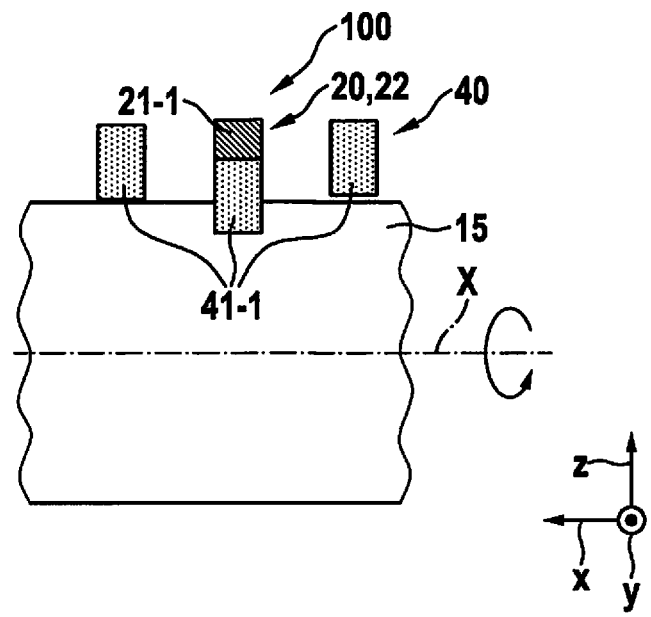

FIG. 5 shows a top view onto the arrangement from FIG. 1 with a view of projection plane V-V from FIG. 1.

Figure 6:
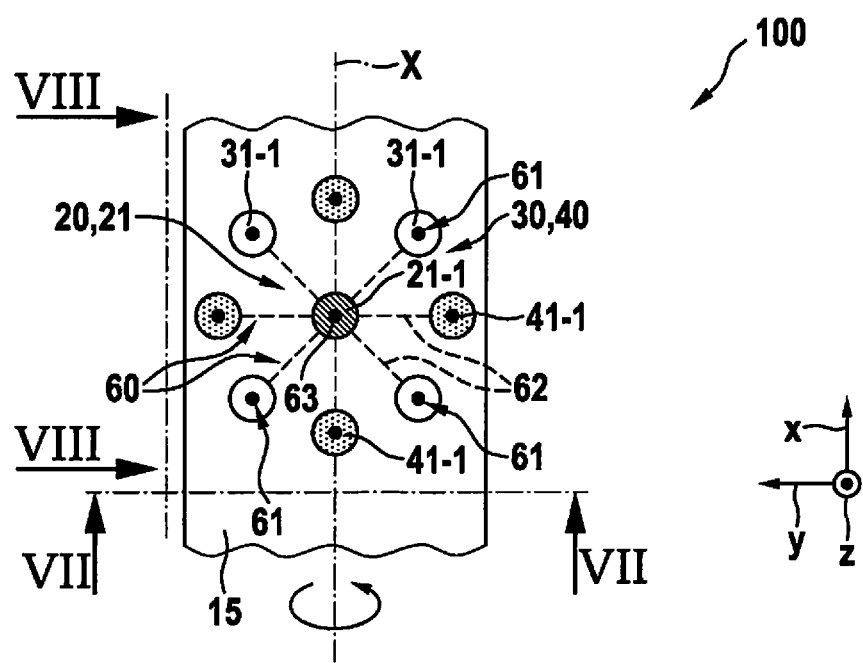
FIGS. 6, 7 and 8 show, in schematic views from different sides, another specific embodiment of the torque detection unit according to the present invention in which the sensor units used are configured to be integrated with one another.
Figure 7:
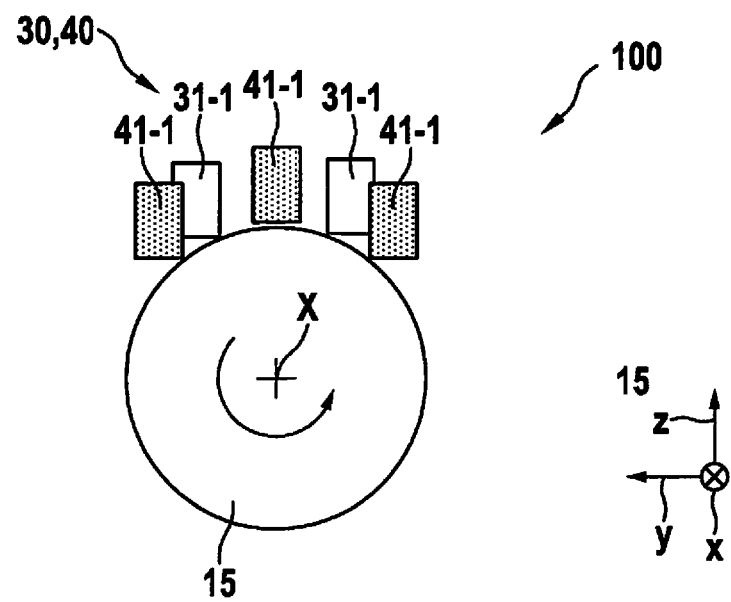
Figure 8:
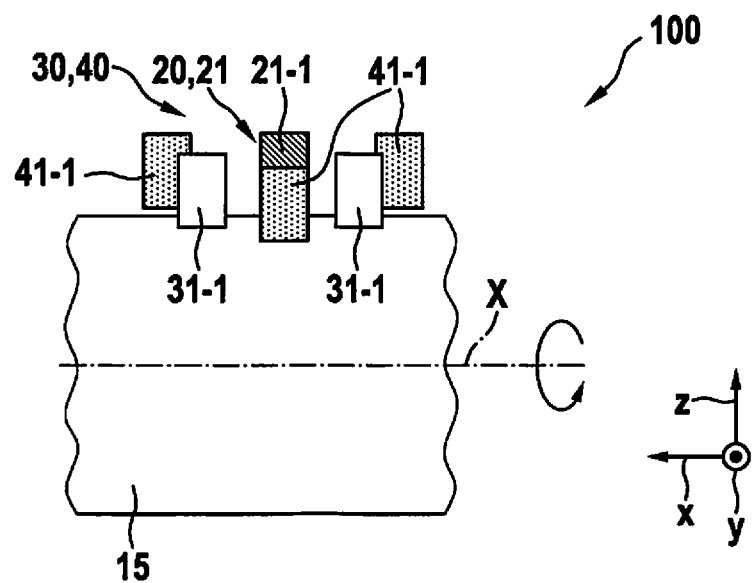

FIGS. 6 through 8 show different views of another specific embodiment of torque detection unit 100 according to the present invention.

In this specific embodiment, first sensor unit 30 and second sensor unit 40 per se have the same setup as first and second sensor units 30 and 40 of the specific embodiment of FIGS. 1 through 5. However, first and second sensor units 30 and 40 are configured to be integrated with one another, and in particular in the sense that their positioning crosses 60 superimpose and form a shared intersecting point 63 in which a single and shared exciter 21 in the form of a solenoid coil 21-1 for excitation unit 20 is situated.

Reception coils 31-1 of first sensor unit 30 and reception coils 41-1 of second sensor unit 40 alternate at an angular distance of 45 degrees. However, it is situated on respective end points 61 of respective positioning crosses 60 having sides 62, which are equally long and situated perpendicularly with respect to one another and have superposed intersecting points 63, which in projection is situated on axis X of crankshaft 15.

FIG. 6 shows a top view onto crankshaft 15 analogous to the illustration of FIG. 1.

FIG. 7 shows a sectional view of the arrangement from FIG. 6 with section plane VII-V11 from FIG. 6.

FIG. 8 shows a side view onto the arrangement from FIG. 6 with a view of projection plane VIII-VIII from FIG. 6.

In FIGS. 1 through 8, the respective wirings for operation, for control and evaluation of individual coils 31-1, 41-1, 21-1 and 22-1 are not explicitly shown. Their description follows in connection with FIGS. 14 through 25.

Figure 9:
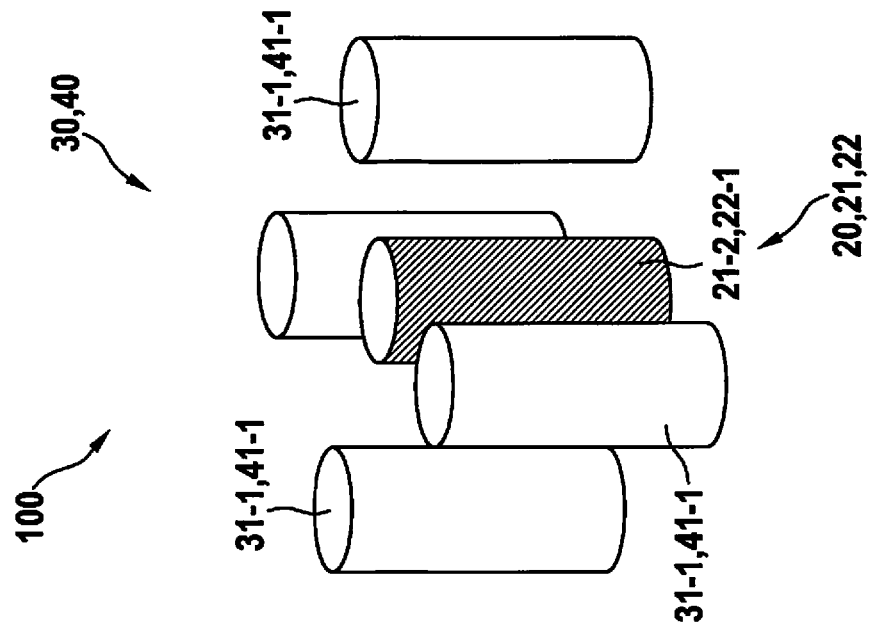
FIGS. 9 and 10 show, in perspective views, details of a sensor unit including reception coils situated in a cruciform manner and an integrated solenoid coil of an underlying excitation unit.
Figure 10:
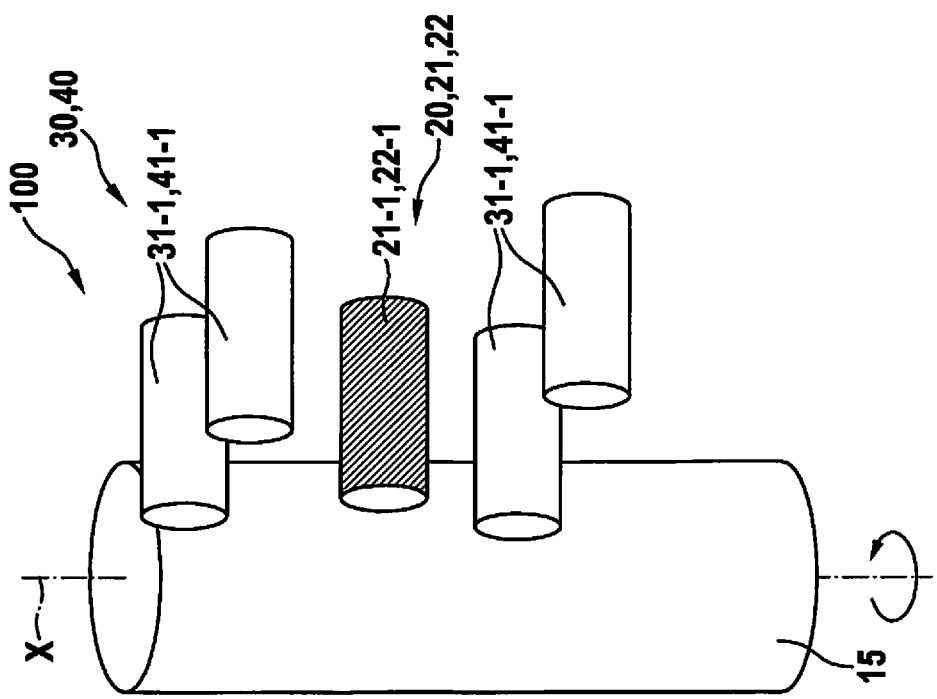

FIGS. 9 and 10 are perspective partial views of the specific embodiment of torque detection unit 100 according to the present invention from FIG. 1 with a focus on first sensor unit 30 and its reception coils 31-1 in combination with solenoid coil 21-1 of exciter 21 of excitation unit 20.

Figure 13:
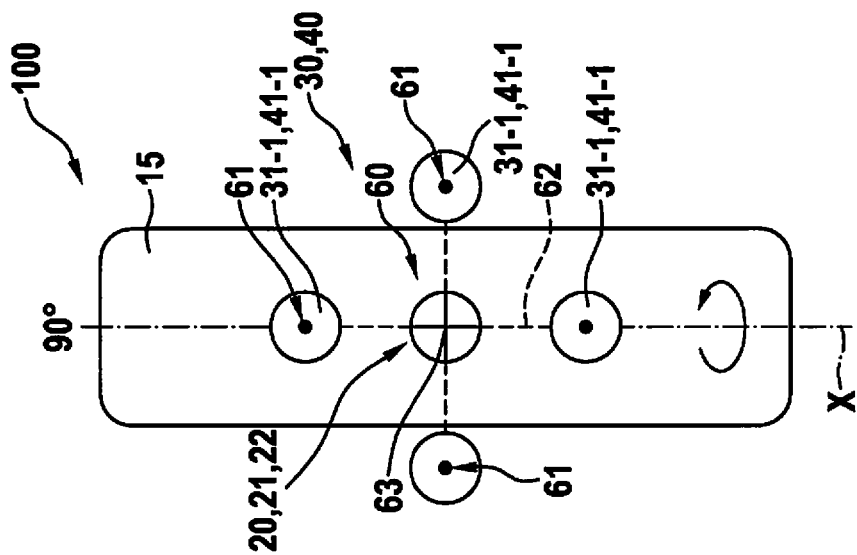
FIGS. 11, 12 and 13 show, in schematic top views, different orientations of a sensor unit with respect to a shaft to be measured and acted upon by a torque.
Figure 12:
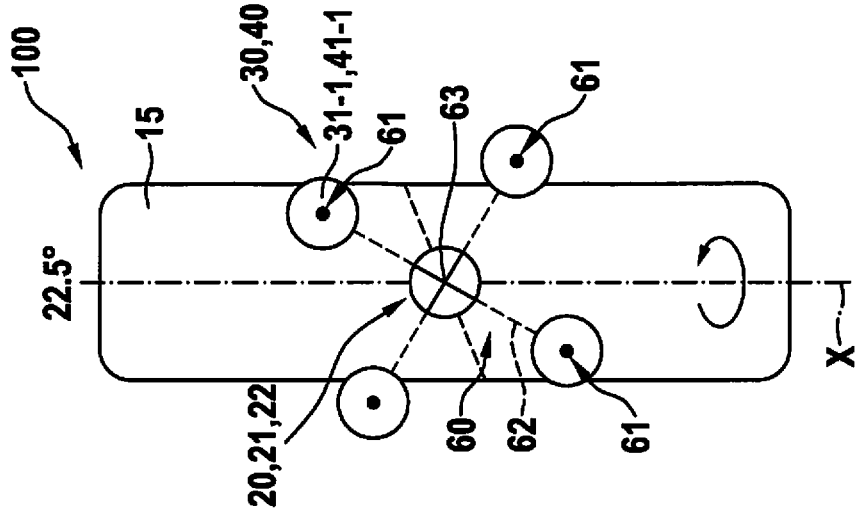
Figure 11:
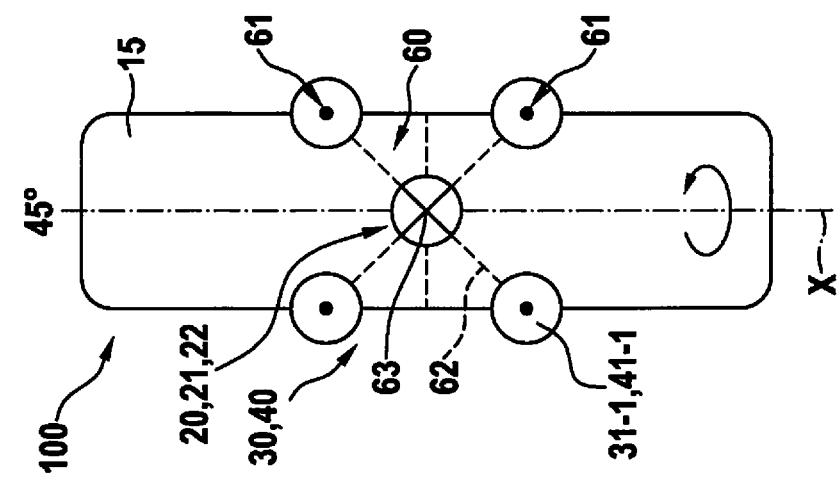

FIGS. 11 through 13 show different orientation options of a sensor unit 30, 40 using positioning cross 60 with respect to axis X of crankshaft 15, and in particular with different angular orientations.

Figure 14:
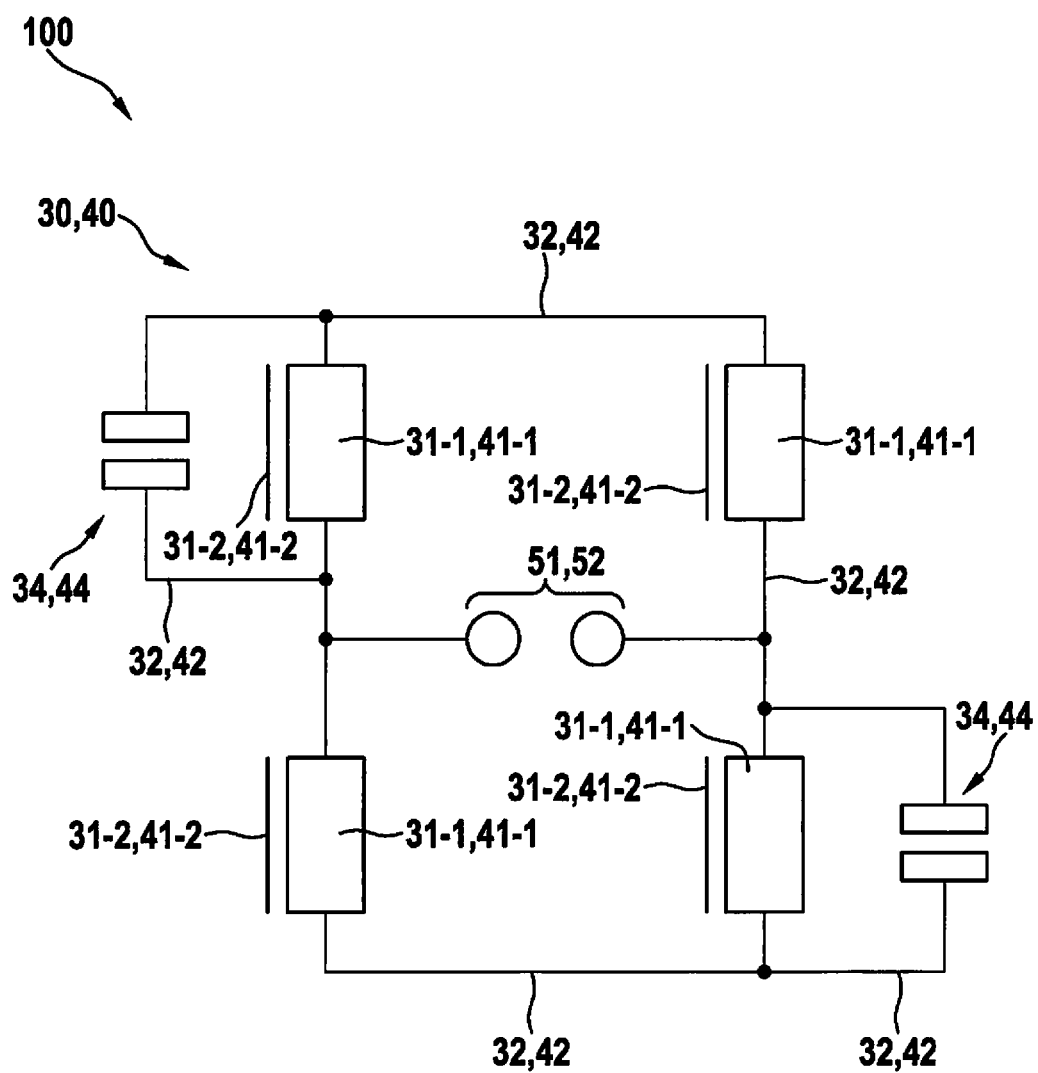
FIG. 14 shows, in a schematic form, a circuit diagram of a setup of a sensor unit which may be used in one specific embodiment of the torque detection unit according to the present invention.
Figure 15:
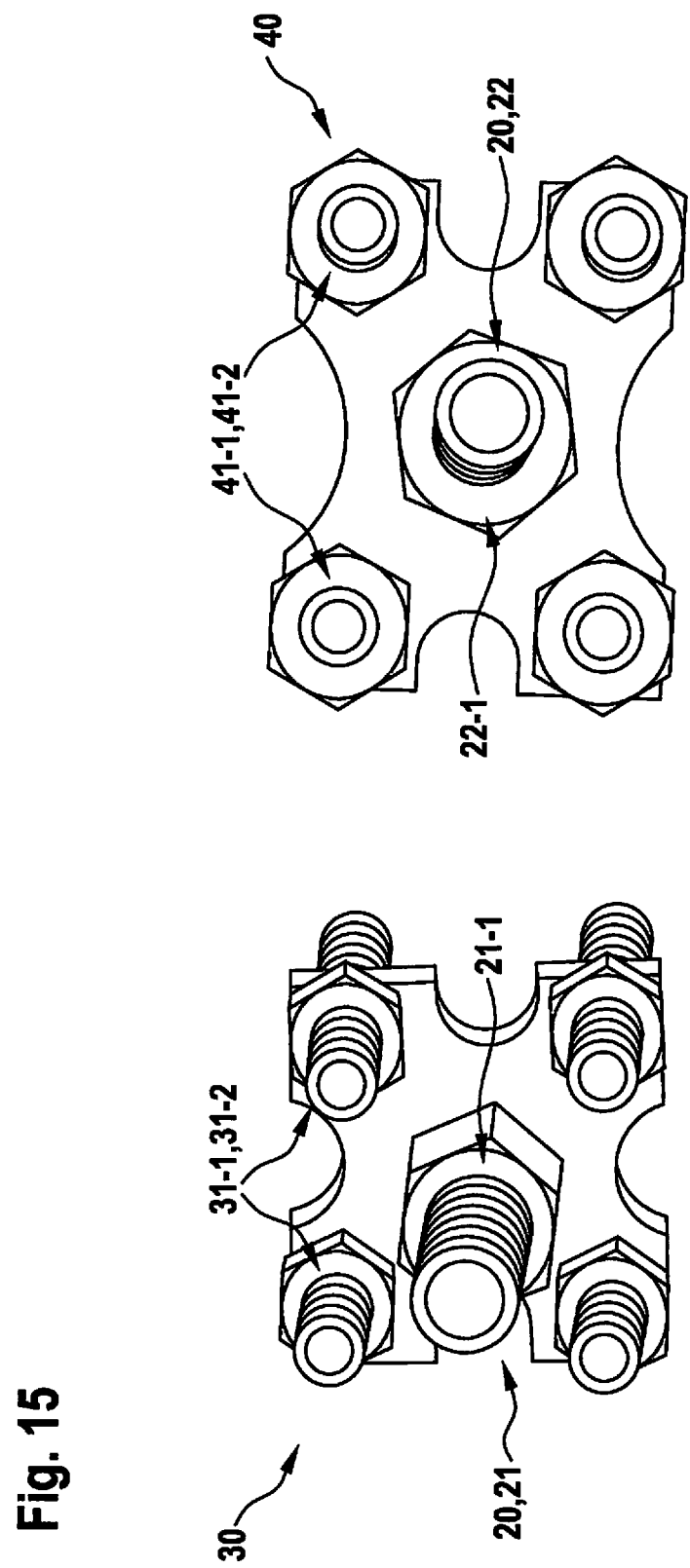
FIGS. 15, 16, 17 and 18 show, in perspective views, various details of one specific embodiment of the torque detection unit according to the present invention including sensor units which are configured separately from one another and made up of discrete components.
Figure 16:
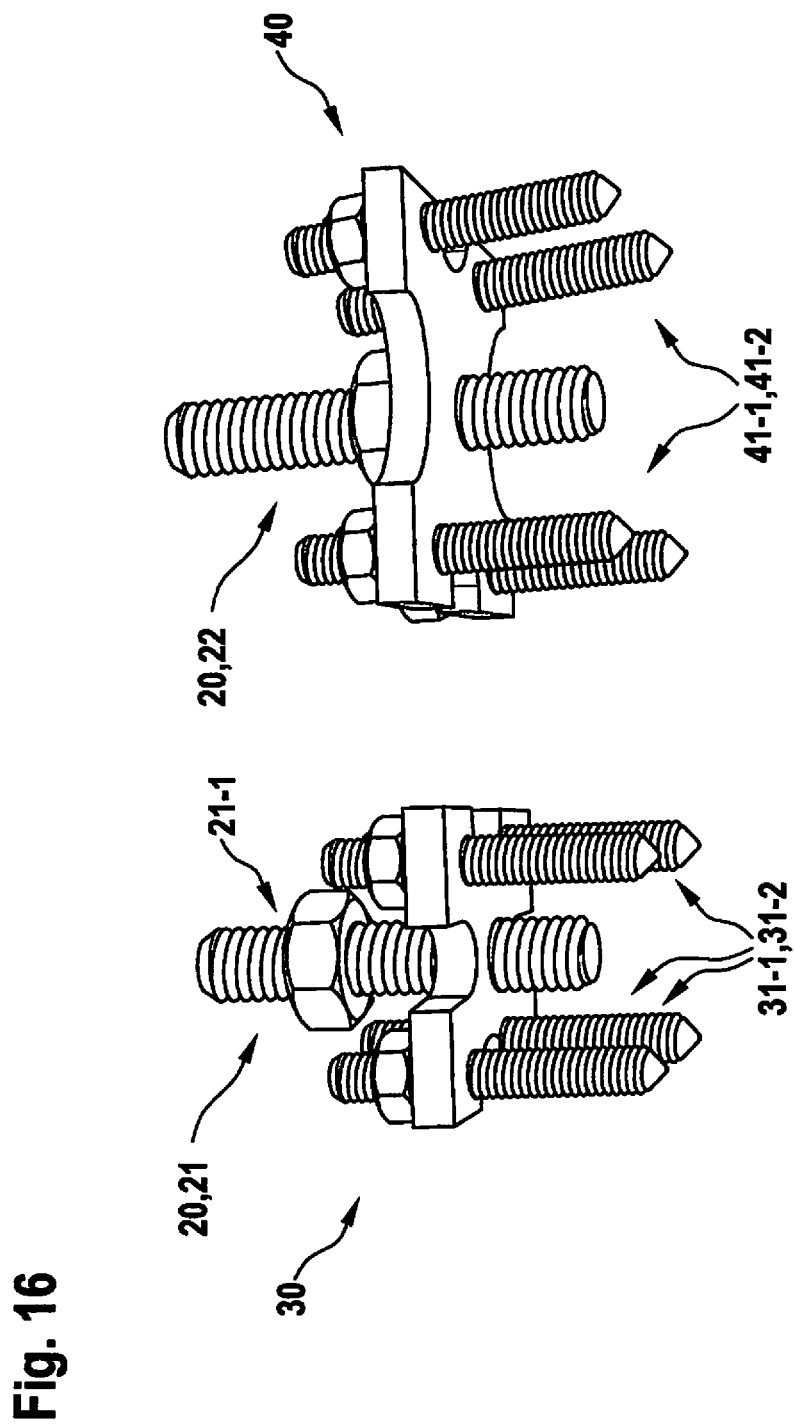
Figure 17:
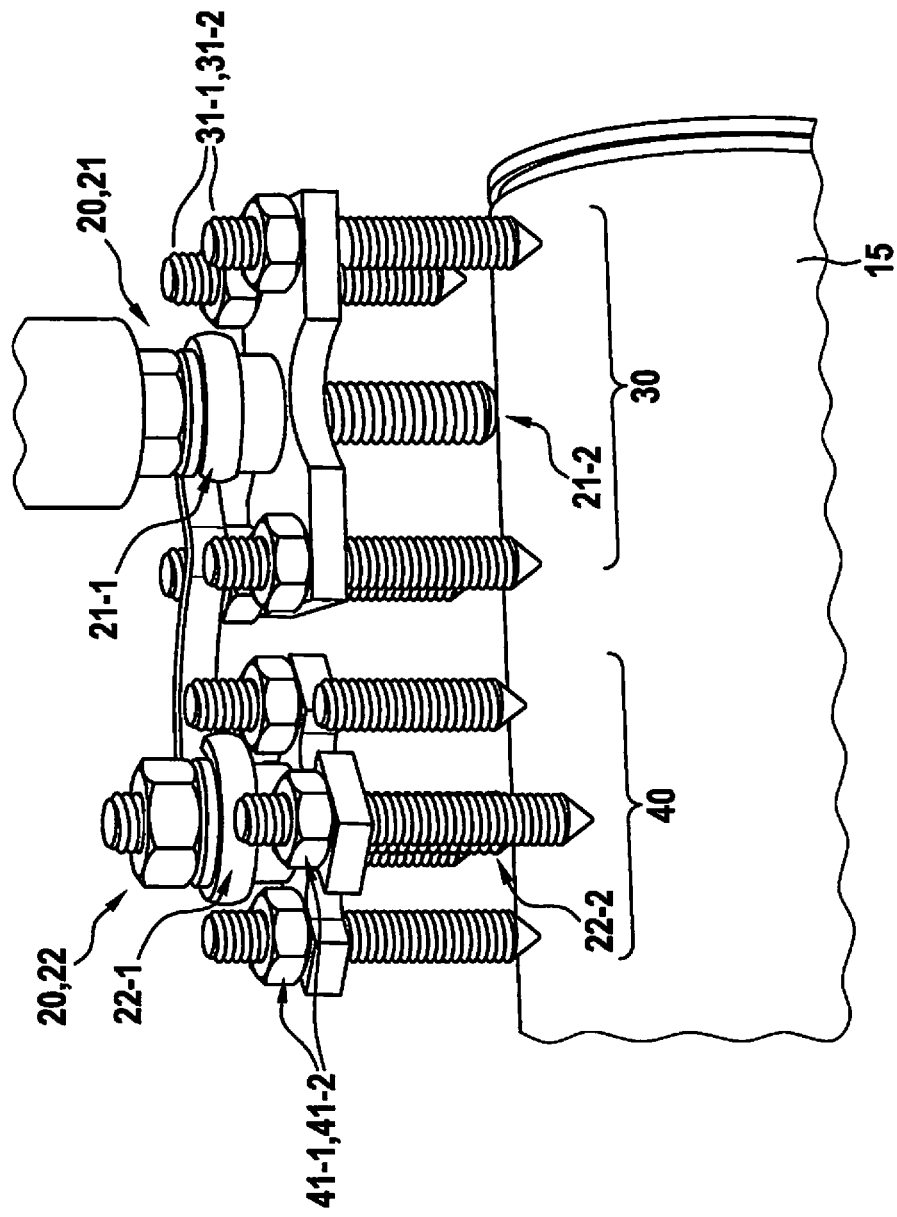
Figure 18:
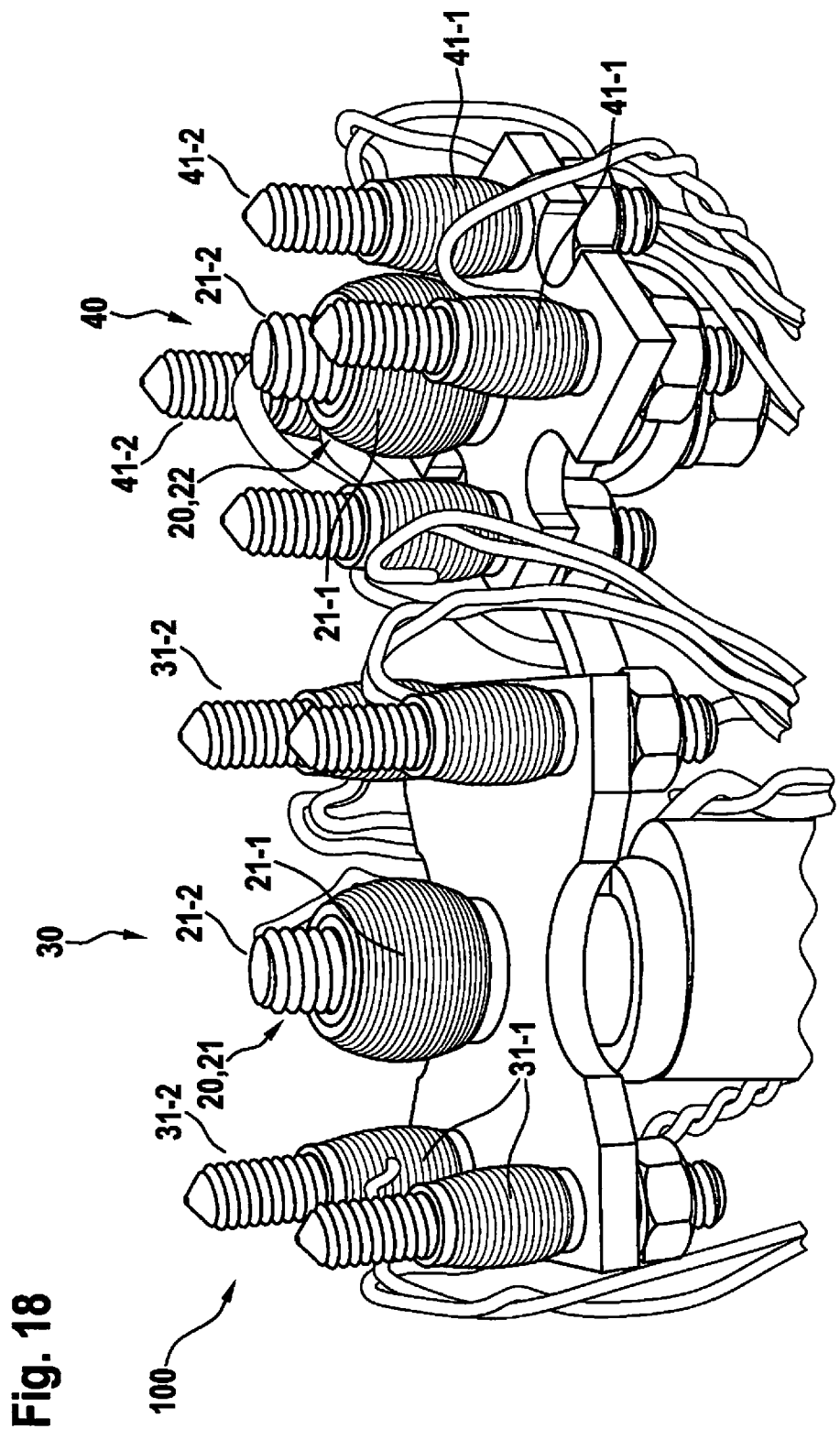
Figure 19:
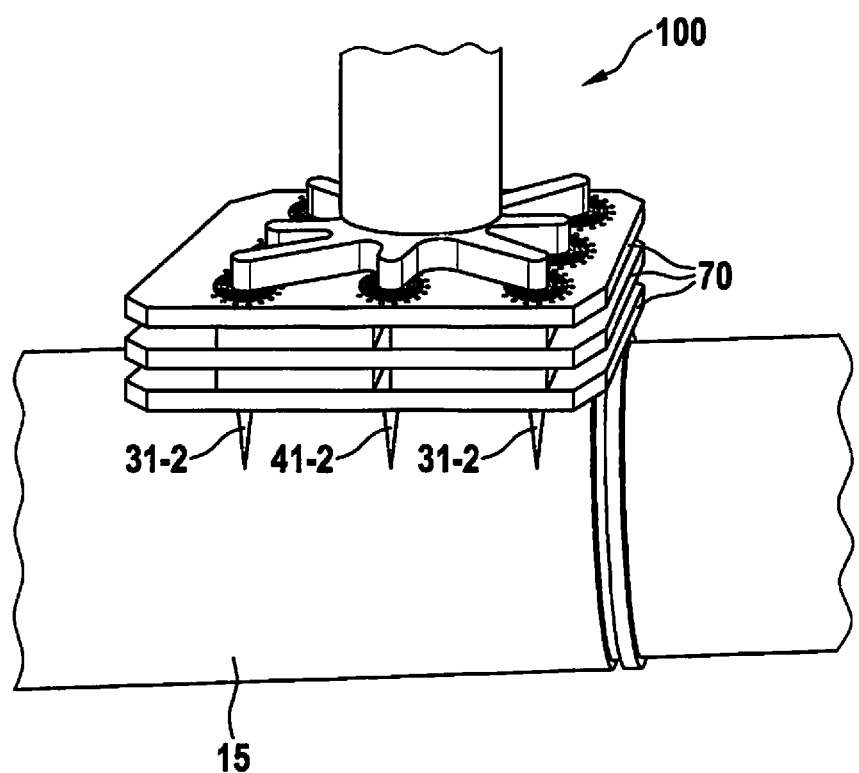
FIGS. 19, 20, 21 and 22 show, in various perspective views and a top view, one specific embodiment of the torque detection unit according to the present invention including sensor units integrated with one another in the form of a circuit board.
Figure 20:
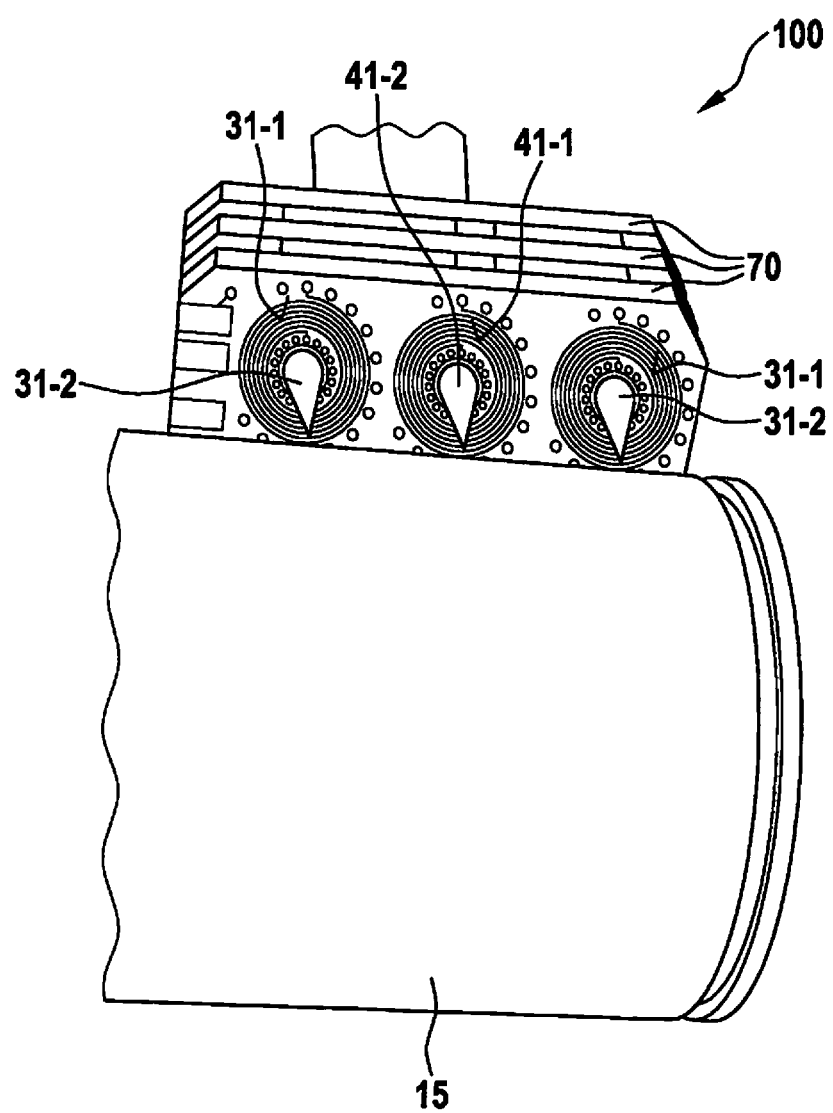
Figure 21:
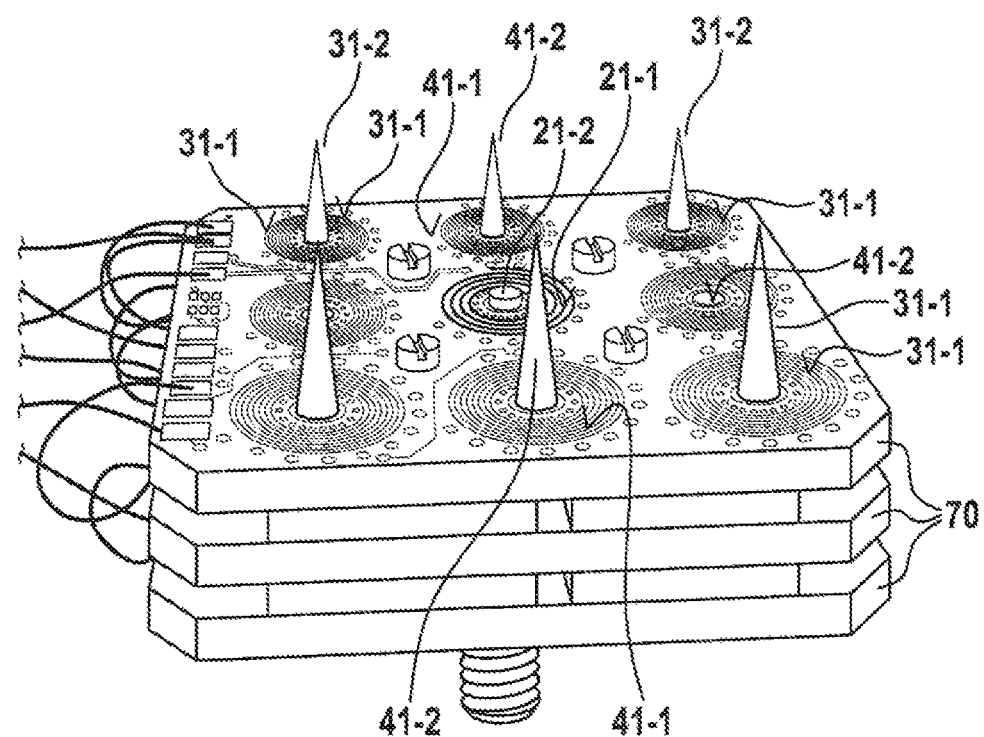
Figure 22:
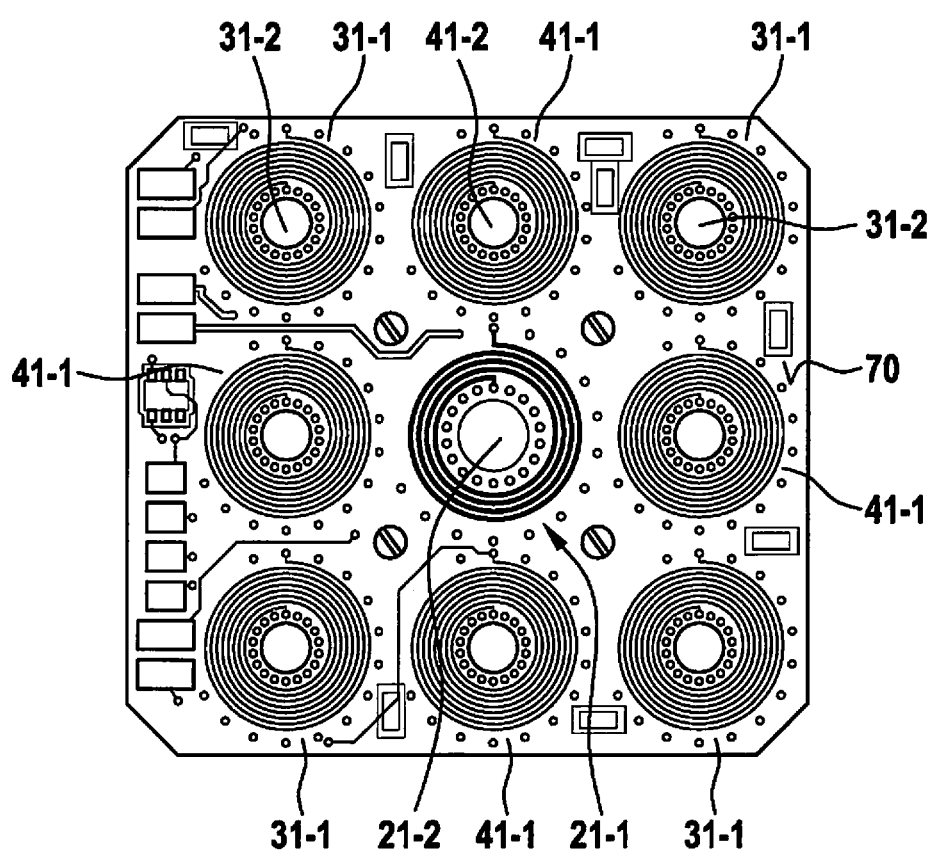

FIG. 14, in the manner of an equivalent circuit diagram, shows the basic setup of first and second sensor units 30 and 40 of one specific embodiment of torque detection unit 100 according to the present invention. Reception coils 31-1 through 41-1 having a respective coil core 31-2 and 41-2 are each appropriately connected via lines 32 and 42 in the manner of a Wheatstone bridge or an inductivity resonance measuring bridge, a corresponding electrical tap being enabled via connections 51 and 52.

Several of reception coils 31-1, 41-1 are configured with a respective tuning capacitor 34, 44 connected in parallel to the respective reception coil 31-1, 41-1. These tuning capacitors 34, 44 may be configured as settable or variable capacitors.

FIGS. 15 through 18 show different perspective views of specific embodiments of torque detection unit 100 according to the present invention, in which first sensor unit 30 and second sensor unit 40 are structurally separated from one another, reception coils 31-1, 41-1 having core 31-2, 41-2 including an exciter 21, in the manner of a solenoid coil 21-2 having a core 21-1, in an integrated manner and axially parallel to one another on a respective positioning cross 60 at end points 61 thereof.

In contrast, FIGS. 19 through 22 show specific embodiments of torque detection unit 100 according to the present invention, in which first and second sensor units 30 and 40 and excitation unit 20 are configured to be integrated with one another, namely by being produced on a number of circuit boards or boards 70.

Figure 23:
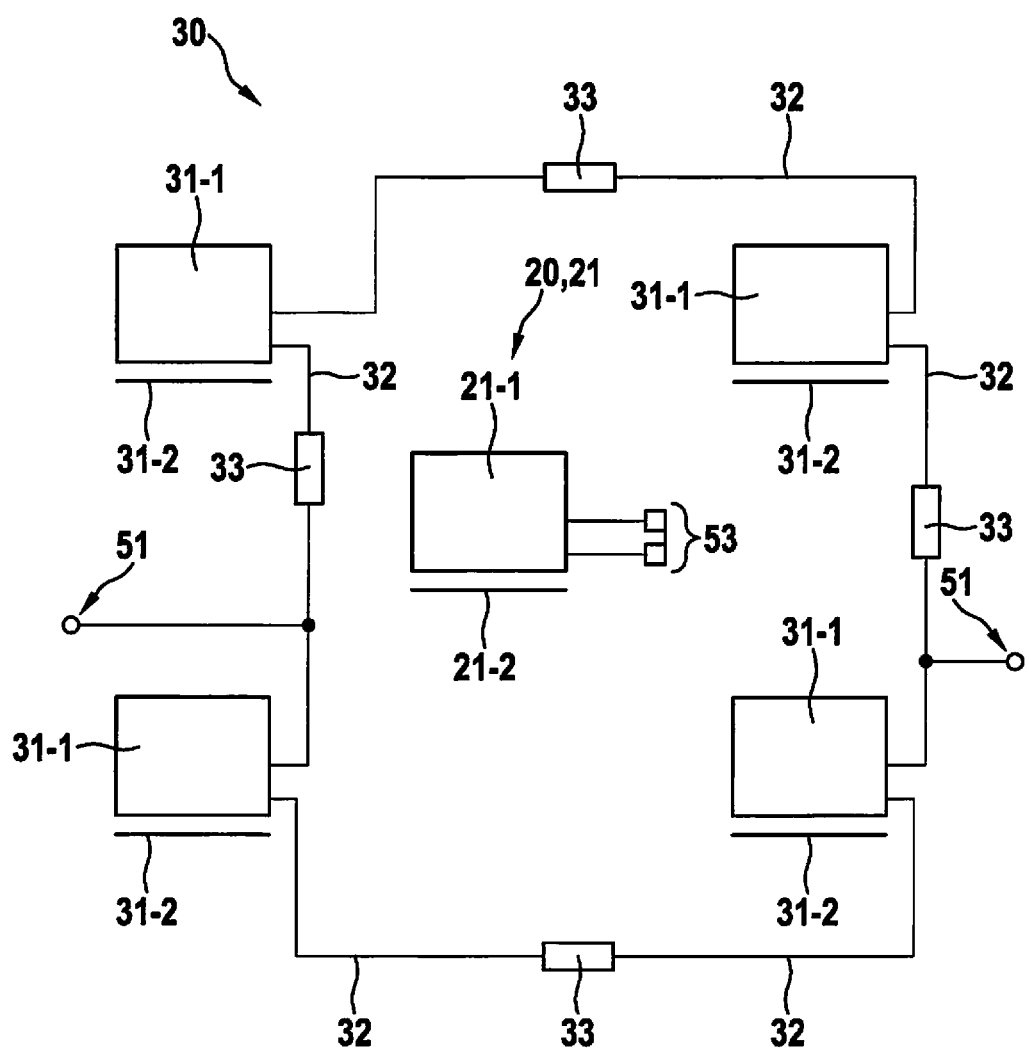
FIGS. 23 and 24 show, in a schematic form, equivalent circuit diagrams for sensor units which may be used as a measuring sensor or as a compensation sensor in one specific embodiment of the torque detection unit according to the present invention.
Figure 24:
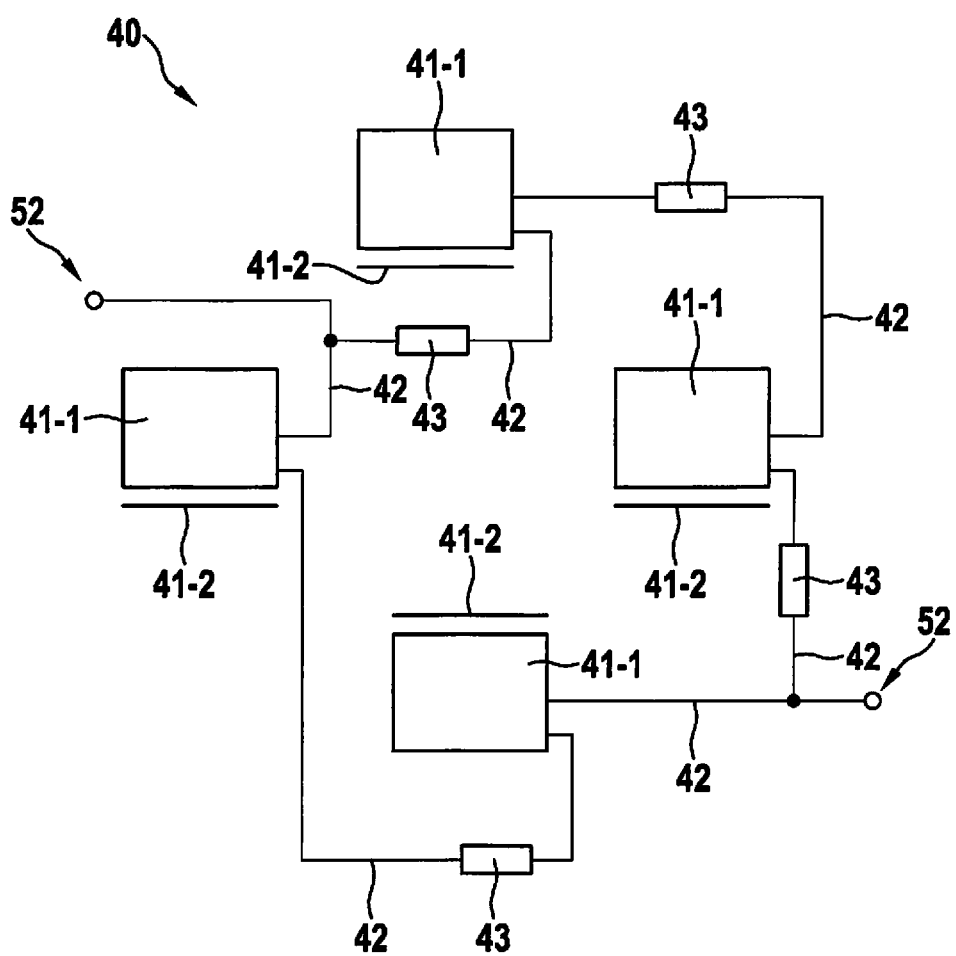

FIGS. 23 and 24 show a first and a second sensor unit 30 and 40, each in the form of an equivalent circuit diagram. It is shown that respective reception coils 31-1, 41-1 having solenoid core 31-2, 41-2 are interconnected with one another via lines 32, 42 in the manner of a Wheatstone bridge or an inductivity resonance measuring bridge, tuning resistors 43 being connected in series between two respective reception coils 31-1, 41-1. Tuning resistors 43 may also have a variable design. The tap to the outside takes place via connections 51, 52.

Figure 25:
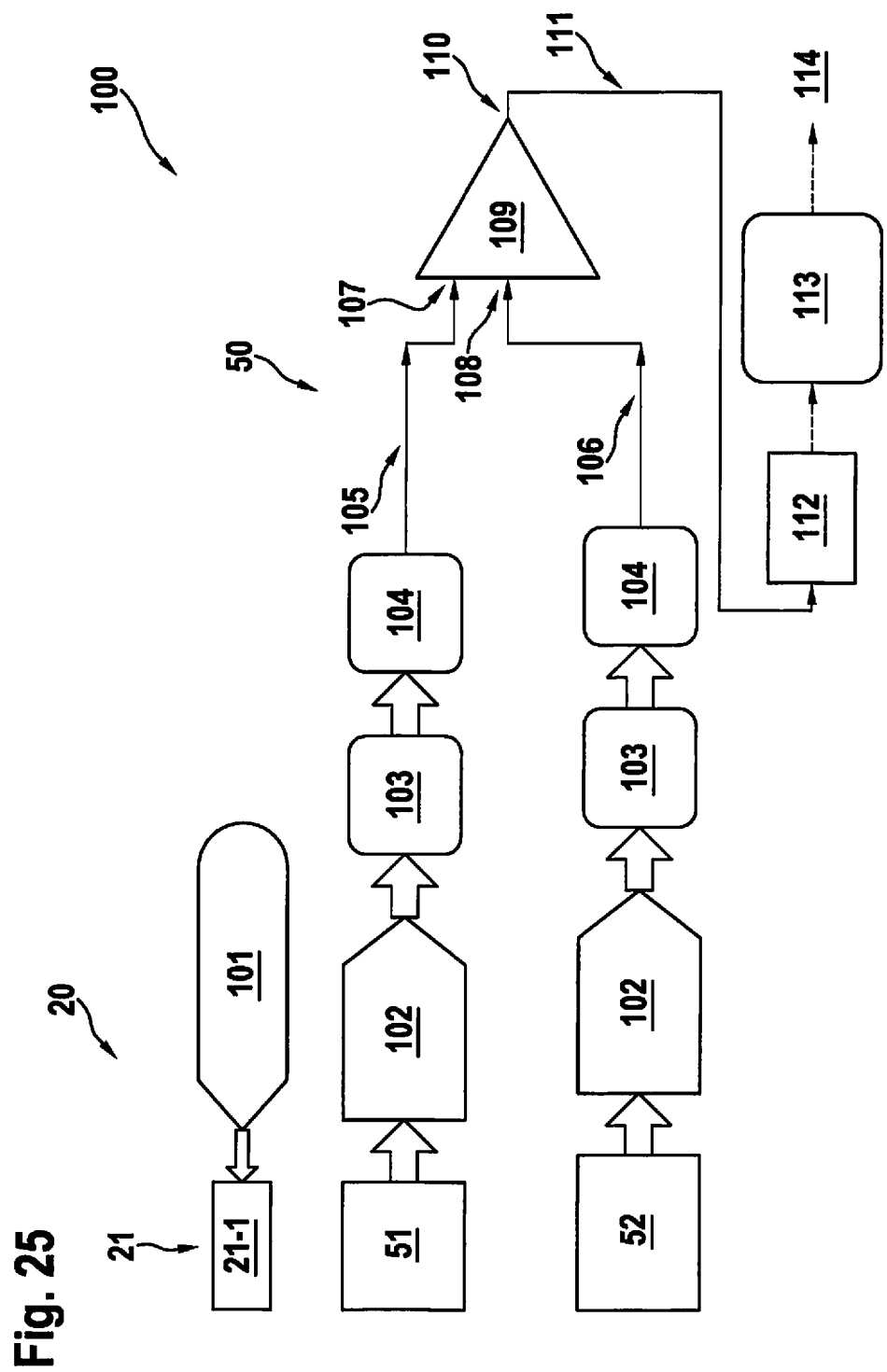
FIG. 25 shows, in the manner of a block diagram, the evaluation diagram underlying one specific embodiment of the torque detection unit according to the present invention.

FIG. 25, in the manner of a schematic block diagram, shows different components and flow elements which may cooperate in one specific embodiment of torque detection unit 100 according to the present invention in connection with an evaluation and control unit 50.

The starting point is an oscillator and generator 101, via which a voltage which changes over time is generated, for example a sinusoidal AC voltage having a frequency of approximately 500 Hz to approximately 5 kHz, which is then fed into solenoid coil 21-1 of exciter 21 of excitation unit 20 for generating an alternating magnetic field.

The alternating magnetic field of exciter 21 is impressed onto crankshaft 15 and detected by first and second sensor units 30, 40 in the manner already described above. The signals generated by first and second sensor units 30, 40 are provided via connections 51 and 52 and received by evaluation and control unit 50.

The signals received via connections 51, 52 are initially forwarded to an input amplification stage 102 and thereby amplified. After passing through a bandpass filter 103 having a central frequency of approximately 500 Hz to approximately 5 kHz and an RMS calculation 104, the then obtained RMS values 105, 106 are supplied to first sensor unit 30 as the measuring sensor and second sensor unit 40 as the compensation sensor of a difference, adaptation and/or scaling unit, or in particular to the mutually inverse inputs 107 and 108 of an operational amplifier 109. Due to this type of interconnection, operational amplifier 109 acts as a differential amplifier and, at its output 110, outputs the analog RMS value of a torque signal 111 in which interferences have been compensated. This is then supplied to an analog-to-digital converter 112. The output signal of analog-to-digital converter 112 is then subjected to a digital filtration and further processing 113. Ultimately, a digital RMS value of torque signal 114 in which interference signals have been compensated is obtained.

These and further features and properties of the present invention are described hereafter based on the following explanations:

One aspect of the present invention is the development of an active sensor for torque measurement on a stationary or rotating shaft. Examples of such rotating shafts are the crankshafts of bicycles, electric bicycles, e-bikes, pedelecs or the like.

With the present invention, in particular an improvement with respect to the susceptibility to interferences from external magnetic fields is to be achieved, e.g., the Earth's field and/or the surroundings, the rotation of the shaft, e.g., due to the non-ideal geometry of shaft 15, vibrations, temperature changes and the like.

The core idea of the present invention is the provision of a second measuring element, and in particular in terms of a second sensor unit 40, which acts as a compensation sensor. As a measuring element made up of multiple mutually interconnected reception coils, it may be used for measuring and for compensating for interferences. An active magnetic measurement takes place at low working frequencies, in particular in the range of less than 5 kHz, which may be in the range of less than 3 kHz.

An analog and/or digital signal processing is used for better signal resolution and to increase the signal-to-noise ratio. Additionally, a temperature compensation is also possible here.

In this connection, first and second sensor units 30 and 40 may also be interpreted as two independent sensor heads, one for the detection and one for the compensation.

In connection with the figures, coil cores 21-2, 31-2 and 41-2 were shown with different geometries on the side facing shaft 15.

As an end face, this side may be adapted in a planar, convex, round, conical and/or local manner to the surface shape of shaft 15, i.e., for example, concavely in the manner of a segment or section of the inner jacket of a circular cylinder and conforming to the outer jacket of shaft 15.

The invention claimed is:

1. A torque detection unit for actively detecting a torque acting on a shaft or a crankshaft of a vehicle, which is drivable by muscle power and/or by motor power along a rotational axis, comprising:
    an excitation unit to apply a magnetic field which changes over time to the shaft; and
    a first sensor unit and a second sensor unit to detect a magnetic field carried by the shaft;
    wherein the first sensor unit and the second sensor unit respectively have four reception coils,
    wherein the first sensor unit and the second sensor unit have different orientations with respect to one another so that they, during operation, are oriented differently from one another with respect to the shaft, and with respect to the rotational axis, and
    wherein the mutual orientation of the first sensor unit and the second sensor unit are configured so that the first sensor unit acts as a measuring sensor and detects the magnetic field excited by the exciter unit and carried by the shaft and that the second sensor unit acts as a compensation sensor, in which the sensitivity for the magnetic field carried by the shaft is lower.

2. The torque detection unit of claim 1, wherein the excitation unit includes a dedicated exciter for each of the sensor units or a shared exciter for the sensor units, each being having a solenoid coil and/or a core.

3. The torque detection unit of claim 1, wherein the reception coils of the respective sensor unit respectively have a core.

4. The torque detection unit of claim 1, wherein the reception coils of a respective sensor unit are interconnected as a bridge circuit, in the form of a Wheatstone bridge and/or an inductivity resonance measuring bridge and/or to a tuning resistor connected in series and/or a tuning capacitor connected in parallel to a respective reception coil.

5. The torque detection unit of claim 1, wherein the reception coils of a sensor unit, with the coil axes, are situated at the end points or in the area of the end points of a cross, the cross having equally long sides and/or an exciter in the area of an intersecting point of the cross.

6. The torque detection unit of claim 1, wherein the sensor units spatially and/or structurally separated or are integrated with one another, overlapping one another, crossed with one another or in a shared structural unit, having a concentric arrangement of their intersecting points and/or having a shared exciter.

7. The torque detection unit of claim 1, wherein a respective sensor unit, a respective reception coil, and/or a respective exciter, a respective solenoid coil, is at least partially configured as a structure of a board or a circuit board or a plurality thereof.

8. The torque detection unit of claim 1, further comprising:
    an evaluation and control unit- to receive representative values for the detected magnetic fields output by the sensor units, and to output the value of a torque signal acting on the shaft based on the received values.

9. A method for generating a torque signal of a shaft that is compensated for interference signals, the method comprising:
    detecting a magnetic field that is excited by an excitation unit of a torque detection unit, wherein the torque detection unit includes an excitation unit to apply a magnetic field that is changeable over time on the shaft, and a first sensor unit and a second sensor unit to detect a magnetic field carried by the shaft, wherein the first sensor unit and the second sensor unit respectively have four reception coils, and wherein the first sensor unit and the second sensor unit have different orientations in relation to each other so that they are oriented differently from each other in operation in relation to the shaft and in relation to the axis of rotation, wherein the mutual orientation of the sensor units is configured that the first sensor unit acts as a measuring sensor and detects the magnetic field that is excited by the excitation unit and carried by the shaft and that the second sensor unit acts as a compensation sensor, in which the sensitivity for the magnetic field carried by the shaft is lower;
    generating the torque signal, which is compensated for by interference signals, and feeding a voltage changeable over time for generating an alternating magnetic field that is changeable over time, into the excitation unit;
    wherein the torque signal, which represents a torque acting on the shaft, is determined based on the received values of the sensor units.

10. The torque detection unit of claim 8, wherein the evaluation and control unit is configured to use a weighted difference between the values received from the first sensor unit and the values received from the second unit as a basis.

11. The torque detection unit of claim 1, further comprising:
    an oscillator, which generates a voltage that is changeable over time, a sinusoidal alternating voltage having a frequency of approximately 500 Hz to approximately 5 kHz, which is fed into the solenoid coil of the excitation unit for generating the alternating magnetic field that is changeable over time.

12. A vehicle drivable by muscle power and/or by motor power, comprising:
    at least one wheel;
    a drive to drive the at least one wheel; and
    a torque detection unit to detect a torque acting on a shaft of the drive, in which the drive is monitorable and/or controllable based on the detected torque;
    wherein the torque detection unit includes:
        an excitation unit to apply a magnetic field which changes over time to the shaft; and
        a first sensor unit and a second sensor unit to detect a magnetic field carried by the shaft;
        wherein the first sensor unit and the second sensor unit respectively have four reception coils,
        wherein the first sensor unit and the second sensor unit have different orientations with respect to one another so that they, during operation, are oriented differently from one another with respect to the shaft, and with respect to the rotational axis, and
        wherein the mutual orientation of the first sensor unit and the second sensor unit are configured so that the first sensor unit acts as a measuring sensor and detects the magnetic field excited by the exciter unit and carried by the shaft and that the second sensor unit acts as a compensation sensor, in which the sensitivity for the magnetic field carried by the shaft is lower.

13. The vehicle of claim 12, wherein the excitation unit includes a dedicated exciter for each of the sensor units or a shared exciter for the sensor units, each being having a solenoid coil and/or a core.

14. The vehicle of claim 12, wherein the vehicle includes a bicycle, an electric bicycle, an e-bike, or a pedelec.

15. The torque detection unit of claim 9, wherein the second sensor unit detects interference signals and the torque signal represents a torque signal that compensates for the thus detected interference signal.

16. The method of claim 9, wherein a sinusoidal alternating voltage having a frequency of approximately 500 Hz to approximately 5 kHz is fed into the excitation unit, and wherein the signals of the first sensor unit and the second sensor unit, after running through a bandpass filter at a central frequency of approximately 500 Hz to approximately 5 kHz, are supplied to a differential amplifier, which outputs an analog value of a torque signal compensated for interferences.

17. The method of claim 9, wherein a sinusoidal alternating voltage having a frequency of approximately 500 Hz to approximately 5 kHz is fed into the excitation unit.

* * * * *